(12) United States Patent
Tsuji et al.

(10) Patent No.: US 8,355,209 B2
(45) Date of Patent: Jan. 15, 2013

(54) LIQUID LENS

(75) Inventors: Minoru Tsuji, Kawasaki (JP); Takashi Urakawa, Kawasaki (JP); Yoshihiro Saito, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 129 days.

(21) Appl. No.: 12/971,652

(22) Filed: Dec. 17, 2010

(65) Prior Publication Data

US 2011/0157711 A1 Jun. 30, 2011

(30) Foreign Application Priority Data

Dec. 25, 2009 (JP) ................................. 2009-294919

(51) Int. Cl.
*G02B 1/06* (2006.01)
*G02B 3/12* (2006.01)
(52) U.S. Cl. ........................................ 359/665; 359/666
(58) Field of Classification Search .................. 359/665, 359/666
See application file for complete search history.

(56) References Cited

U.S. PATENT DOCUMENTS

RE39,874 E * 10/2007 Berge et al. ................... 359/666
2012/0050881 A1* 3/2012 Yamazaki et al. ............ 359/666

FOREIGN PATENT DOCUMENTS

JP 2007-225779 A 9/2007

OTHER PUBLICATIONS

"Research on Surface Free Energy of Electrowetting Liquid Zoom Lens", Z. Cunhua, L. Gaoqi, W. Daling, H. Xinhua, C. Dongquing and G. Changliu, Proceedings SPIE vol. 89194 (2011).*

* cited by examiner

*Primary Examiner* — David N Spector
(74) *Attorney, Agent, or Firm* — Fitzpatrick, Cella, Harper & Scinto

(57) ABSTRACT

A liquid lens in which are contained an insulating first liquid and a conductive second liquid having non-miscibility and different refractive indexes, optical characteristics being changed by a change of an interface shape of the first and second liquids by applying a voltage to an electrode, the lens including: in a surface in contact with an edge of an interface of the first and second liquids, a first region having an affinity for the first liquid; a second region having an affinity different from that of the first liquid; and a voltage applying unit, wherein when the interface shape is changed, by an affinity force to hold the first liquid within the first region and a force to move the edge to the second region by electro-wetting, the edge can be stably held at an edge of the first region.

7 Claims, 6 Drawing Sheets

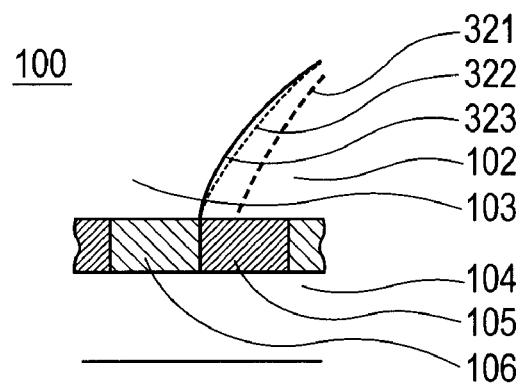
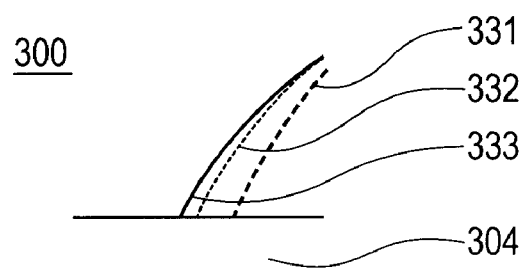
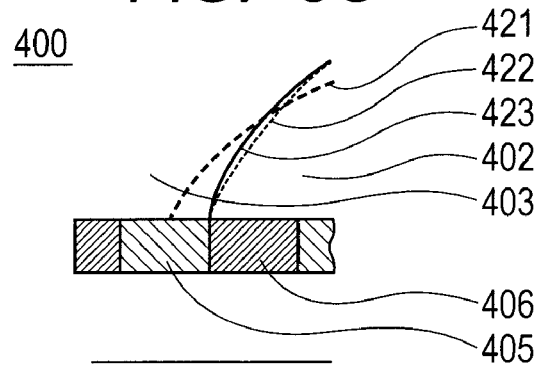

LIQUID LENS

BACKGROUND OF THE INVENTION

1. Field of the Invention

The present invention relates to a liquid lens, and more particularly to a liquid lens that constitutes an optical element for actively obtaining power.

2. Related Background Art

In recent years, a liquid lens has been developed as one of lenses that can change refractive power.

Japanese Patent Application Laid-Open No. 2007-225779 discloses a description on the principle of a liquid lens that changes refractive power using electrowetting. In addition, a technique is disclosed on an optical element that improves centering properties of a liquid that constitutes the liquid lens and stabilizes an optical axis. With the optical element described in Japanese Patent Application Laid-Open No. 2007-225779, two regions having affinities for two liquids that constitute the liquid lens are formed alternately and concentrically with the optical axis of the liquid lens, and thus a peripheral position of an interface of the liquids can be specified with high accuracy.

However, if an external force caused by vibration or the like is applied to the liquid lens using the technique disclosed in Japanese Patent Application Laid-Open No. 2007-225779, the peripheral position of the interface is moved on any of the two regions, which may reduce optical performance.

Further, also for a liquid lens that does not use the technique disclosed in Japanese Patent Application Laid-Open No. 2007-225779, stably holding a peripheral position of an interface is an important challenge for stably maintaining optical performance.

SUMMARY OF THE INVENTION

In view of the above-described problems, the present invention has an object to provide a liquid lens that can stably hold a peripheral position of an interface of liquids.

The present invention provides a liquid lens in which in a container that contains a liquid, an insulating first liquid and a conductive second liquid having non-miscibility and different refractive indexes to each other are contained, and optical characteristics are changed by a change of interface shape of the first liquid and the second liquid caused by application of a voltage to an electrode provided in the container, comprising: in a surface in contact with an edge of interface of the first liquid and the second liquid, a first region having an affinity for the first liquid formed on an insulating layer located on the electrode; and a second region having an affinity different from the affinity for the first liquid formed on the insulating layer, wherein when the interface shape of the first liquid and the second liquid is changed, utilizing an affinity force to hold the first liquid in the vicinity of the edge of the interface within the first region and a force to move the edge of the interface to the second region by electro-wetting, the edge of the interface can be held at an edge of the first region.

According to the present invention, a liquid lens that can stably hold a peripheral position of an interface of liquids can be achieved.

Further features of the present invention will become apparent from the following description of exemplary embodiments with reference to the attached drawings.

BRIEF DESCRIPTION OF THE DRAWINGS

FIG. 3A is a diagram illustrating an operation of an edge of interface of the liquid lens in FIG. 1A, according to Embodiment 1.

FIG. 3B is a diagram illustrating an operation of an edge of interface of a liquid lens different from that of the present invention.

FIG. 3C is a diagram illustrating an operation of an edge of interface of a liquid lens having a configuration different from that of the liquid lens in FIG. 1A, according to Embodiment 1.

DESCRIPTION OF THE EMBODIMENTS

Preferred embodiments of the present invention will now be described in detail in accordance with the accompanying drawings.

The mode for carrying out the present invention will be described with reference to the following embodiments.

EMBODIMENT

Embodiment 1

As Embodiment 1, an exemplary configuration of a liquid lens to which the present invention is applied will be described with reference to FIGS. 1A and 1B. The configuration includes a structure of changing an interface shape of liquids contained in a container by application of a voltage to an electrode provided in the container, and thus changing optical characteristics.

Figure 1A:
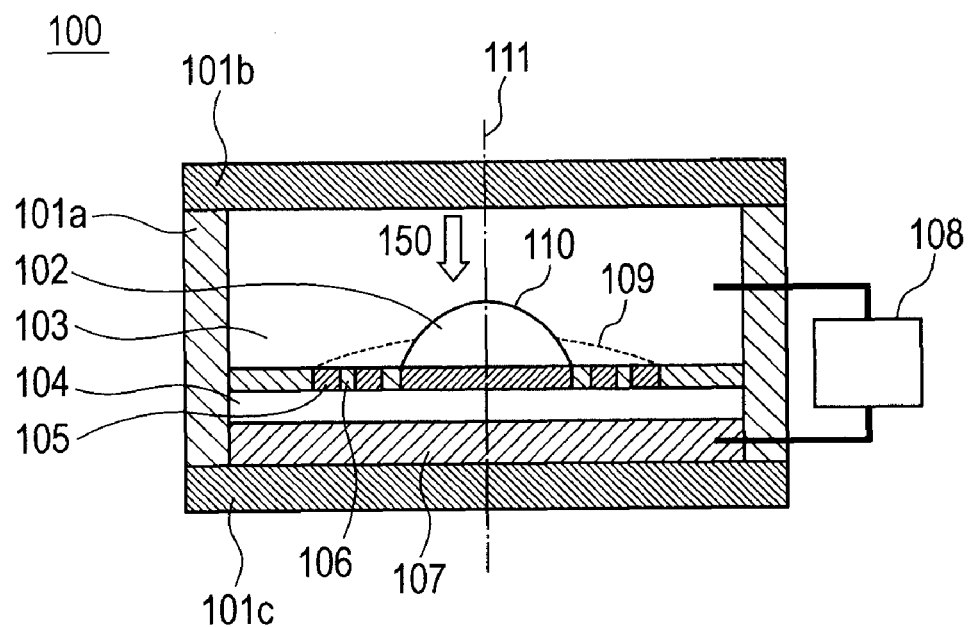
FIG. 1A is a sectional view of a liquid lens according to Embodiment 1 of the present invention.

As illustrated in FIG. 1A, a liquid lens 100 of this embodiment includes a cylindrical container in which lid members 101$b$ and 101$c$ having optical transparency are joined on a side of a cylindrical member 101$a$ on which a light from outside is incident. The cylindrical container contains a first liquid 102 having insulating properties and optical transparency, and a second liquid 103 having conductivity and optical transparency. In an interface of the liquids, the second liquid 103 covers an upper portion of a spherical shape formed by the first liquid 102.

The first liquid 102 and the second liquid 103 have non-miscibilities and different refractive indexes. When the first liquid 102 and the second liquid 103 have different densities, the interface of the liquids is not formed into a spherical shape due to the effect of gravity. Thus, the first liquid 102 and the second liquid 103 desirably have close densities to each other.

The first liquid 102 and the second liquid 103 are in contact with a planar insulating layer 104 via a thin film. The thin film is formed of a first region 105 and a second region 106 having different affinities for the first liquid 102 on the insulating layer 104. An affinity for the first liquid 102 of the first region 105 is higher than an affinity for the first liquid 102 of the second region 106. An affinity for the first liquid 102 of the first region 105 is higher than an affinity for the second liquid 103.

Figure 1B:
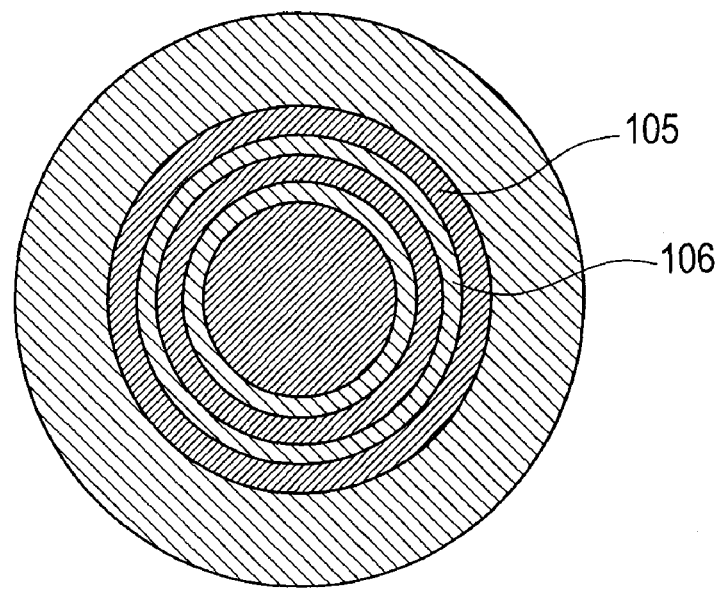
FIG. 1B is a view of the liquid lens of FIG. 1A taken in the direction of arrow therein, according to Embodiment 1 of the present invention.

FIG. 1B is a view of the first region 105 and the second region 106 in the liquid lens 100 in FIG. 1A taken in the direction of arrow 150. As illustrated in FIG. 1B, the first region 105 and the second region 106 are formed in a concentric pattern.

Returning to FIG. 1A, the description will be continued. An electrode 107 is formed in a planar shape in a position on the side opposite to the first liquid 102 and the second liquid 103 via the insulating layer 104. When a voltage application apparatus 108 applies a voltage between the second liquid 103 and the electrode 107, the interface of the first liquid 102 and the second liquid 103 is changed from an interface 109 to an interface 110.

In order to prevent a short circuit of the voltage via the cylindrical member 101a when the voltage is applied, the cylindrical member 101a is formed of an electrically insulating member. In another configuration, an electrically insulating member may be provided on an inner wall surface of the conductive cylindrical member 101a.

The liquid lens 100 illustrated in FIG. 1A has a structure in which a light is incident from outside in a direction of an optical axis 111. The lid members 101b and 101c need to have optical transparency and are thus formed of members having optical transparency such as glass or acrylic. Like the lid members 101b and 101c, the insulating layer 104 and the electrode 107 illustrated in FIG. 1A are formed vertically to the direction of the optical axis 111 and exist on an optical path and need to have optical transparency, and are thus formed of members having optical transparency such as an insulating layer of polyparaxylylene or an ITO electrode. Since the optical transparency required of the liquid lens of this embodiment differs depending on uses of the liquid lens, a broad transparent wavelength width or high optical transmittance are not always necessary. Thus, the optical transparency is not specified by a qualitative or quantitative specific reference.

The cylindrical member 101a may have functions and performance other than those described above. For example, in order to prevent generation of an optical ghost in the liquid lens 100, a black coating may be applied to a surface of the cylindrical member 101a.

Figure 2:
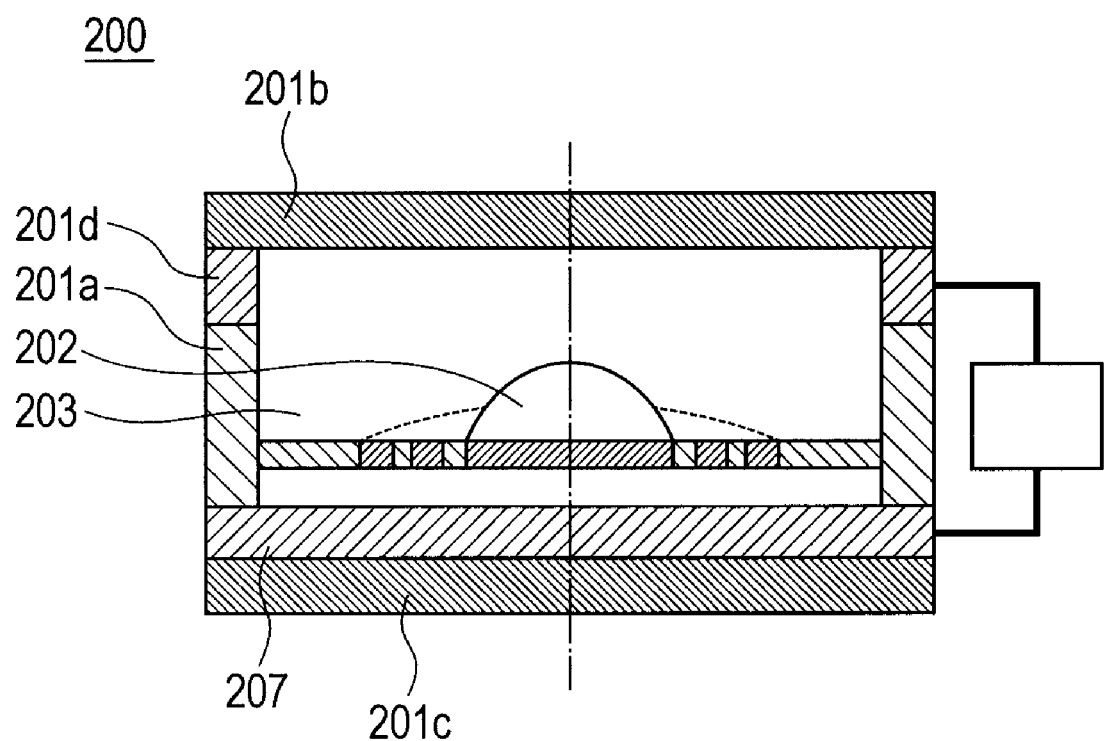
FIG. 2 is a sectional view of a liquid lens having a configuration different from that of the liquid lens in FIG. 1A, according to Embodiment 1 of the present invention.

FIG. 2 is a sectional view of a liquid lens having a configuration different from that of the liquid lens in FIG. 1A. In FIG. 2, a liquid lens 200 includes cylindrical members 201a and 201d, lid members 201b and 201c, a first liquid 202, a second liquid 203, and an electrode 207.

In the liquid lens illustrated in FIG. 2, the electrically insulating cylindrical member 201a and the electrically conductive cylindrical member 201d are formed instead of the cylindrical member 101a of the liquid lens 100 in FIG. 1A. The electrode 207 is joined between the cylindrical member 201a and the lid member 201c. A voltage is directly applied between a wall surface of the cylindrical member 201d exposed to the outside and an end of the electrode 207 similarly exposed to the outside, thereby changing an interface of the first liquid 202 and the second liquid 203.

Silicone oil or the like is used as the first liquid 102, and a sodium chloride solution or the like is used as the second liquid 103. When silicone oil is used as the first liquid 102 and a sodium chloride solution is used as the second liquid 103, thin films formed by applying polyisobutylene and polytetrafluoroethylene on the insulating layer 104 are the first region 105 and the second region 106, respectively. Since polyisobutylene has lipophilic properties and polytetrafluoroethylene has lipophobic properties, polyisobutylene has a higher affinity for silicone oil as the first liquid 102. Since polyisobutylene has hydrophobic properties, an affinity for silicone oil as the first liquid 102 is higher than an affinity for a sodium chloride solution as the second liquid 103.

As such, the first region 105 and the second region 106 may have the affinities for the first liquid 102 and the second liquid 103 that satisfy the above-described relationships. Of course, the affinities that satisfy the above-described relationships may be provided by surface treatment of the insulating layer 104, or by using an affinity of the insulating layer 104 without change.

Next, an operation of the edge of interface of the liquid lens will be described with reference to FIGS. 3A to 3C.

FIG. 3A is a schematic diagram illustrating an operation near the edge of interface of the liquids when different voltages are applied to the liquid lens 100 illustrated in FIG. 1A. In the description below, the voltage represents an absolute value of an effective value unless otherwise specified.

An interface when a specific voltage V1, at which the edge of the interface is located in the first region 105, is applied to the liquid lens 100 is represented by an interface 321. When an applied voltage is reduced to a specific voltage V2 described later, the interface 321 is moved to an interface 322 that is an interface when the edge of interface is located at an edge of the first region 105. When the applied voltage is further reduced, the edge of interface is continuously located at the edge of the first region 105 while the voltage is within a certain range, and the interface is as represented by an interface 323.

When the interface is represented by the interface 323, an affinity force to hold the first liquid 102 in the vicinity of the edge of the interface within the first region 105 by affinity between the first liquid 102 and the first region 105, and a force to move the edge of the interface onto the second region 106 by electro-wetting are applied. Here the force by electro-wetting is a force to move the interface to a position where the sum of an interface energy of a surface that the first liquid 102 contacts with, an interface energy of a surface that the second liquid 103 contacts with, an interface energy of the interface, and an electrostatic energy stored between the second liquid and the electrode, becomes minimum. And the force by electro-wetting, when referring to FIG. 3A is a force arisen along the surface of the first region 105 and the second region 106. On the other hand, although the affinity force is also a force arisen along the surface of the first region 105 and the second region 106, it is a force applied to the opposite direction to that of the force by electro-wetting. When the affinity force to hold the first liquid in the first region 105 is larger than the force to move the position of the edge of the interface onto the second region 106, the edge of interface is held to overlap the edge of the first region 105 like the interface 323. At this time, since the two forces in the different directions are applied to the first liquid 102 near the edge of interface, the edge of interface is stably held at the edge of the first region 105 even if a disturbance to move the edge of interface occurs.

When the affinity of the second region 106 for the second liquid 103 is higher than the affinity of the first region 105 for the second liquid 103, the affinity force to hold the second liquid 103 on the second region 106 is applied to the second liquid 103. Then, the edge of interface is hard to move on the first region 105, and more stably held at the edge of the first region 105.

As is apparent from the interfaces 322 and 323 of the liquid lens 100 illustrated in FIG. 3A, the edge of the first region 105 at which the edge of interface is held refers to one of two edges of the first region 105, at which the edge of interface reaches when an applied voltage is reduced. Which of the two edges of the first region the edge of the first region at which the edge of interface is held refers to depends on a relationship between the affinities for the first liquid and the second liquid of the first region and the second region. Also, in the case where a liquid lens 400 described later is used, in contrast to the case where the liquid lens 100 is used, the edge of the first region at which an edge of interface is held refers to one of two edges of the first region, at which the edge of interface reaches when an applied voltage is increased.

Figure 4A:
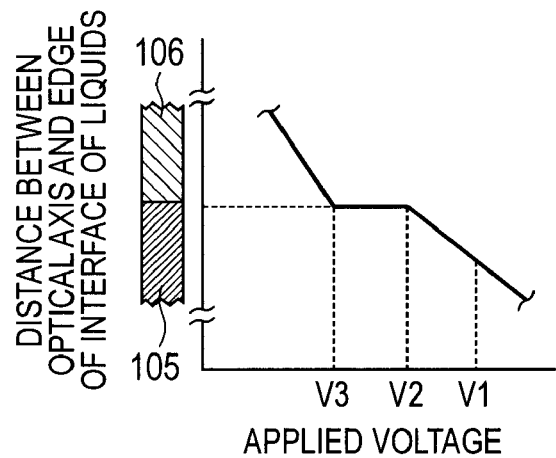
FIG. 4A is a view illustrating a relationship between a voltage and a distance between an optical axis and an edge of interface in Embodiment 1.

FIG. 4A is a schematic diagram illustrating a relationship between an applied voltage and a distance between an optical axis and the edge of interface of the liquids in the liquid lens 100, illustrated in FIG. 3A. As illustrated in FIG. 4A, when the applied voltage is between a voltage V3 and a voltage V2, the edge of interface is held at the edge of the first region 105.

In order to more stably hold the edge of interface, it is effective to set the applied voltage to a voltage away from each of V3 and V2 such as arithmetic mean or geometric mean of V3 and V2. If a difference between the affinity of the first region 105 and the affinity of the second region 106 is increased, a difference between the voltage V2 and the voltage V3 is increased. This is effective for more stably holding the edge of interface. Thus, it is also effective that the second region 106 does not have the same affinity as the first region 105. For example, when the first region 105 has lipophilic properties, the second region 106 may have oil repellency.

To calculate values of the voltage V2 and the voltage V3, a position of the edge of interface may be observed while the applied voltage is gradually reduced from the voltage V1, and a voltage at which the edge of interface is located at the edge of the first region 105 may be set to V2, and a voltage at which the edge of interface is moved away from the edge of the first region 105 may be set to V3.

Now, a case will be described where a first region and a second region are not formed on an insulating layer unlike the liquid lens of this embodiment.

FIG. 3B is a schematic diagram illustrating an operation near the edge of interface of the liquids of a liquid lens 300 having an insulating layer 304 without a first region 105 and a second region 106 being formed unlike the liquid lens of Embodiment 1. When an interface of the liquids when a specific voltage V4, at which the edge of the interface is located at a specific region, is applied to the liquid lens 300 is represented by an interface 331 and an applied voltage is reduced to specific voltages V5 and V6, the interface 331 is continuously moved to an interface 332 and an interface 333.

For example, a state where an interface determined by the voltage V6 is represented by the position of the interface 333 is a state where an edge of the interface 333 is located in a position where the sum of the interface energy and the electrostatic energy becomes minimum, and when disturbance to move the position of the edge of the interface 333 occurs, the position of the edge of the interface 333 may be moved.

Figure 4B:
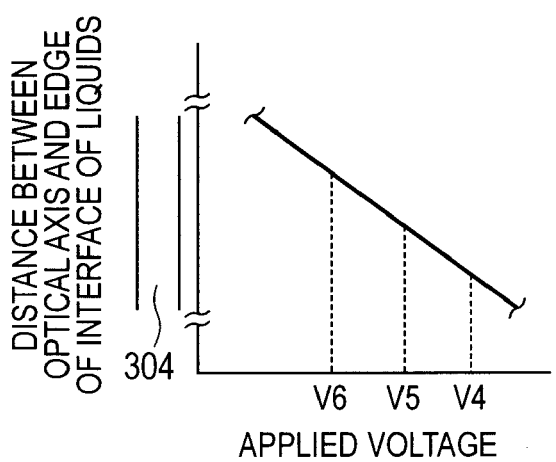
FIG. 4B is a view illustrating a relationship between a voltage and a distance between an optical axis and an edge of interface in the liquid lens in FIG. 3B different from that of the present invention.

FIG. 4B is a schematic view illustrating a relationship between an applied voltage and a distance between an optical axis and an edge of interface of liquids in the liquid lens 300, illustrated in FIG. 3B. As illustrated in FIG. 4B, in the liquid lens 300 in which the thin film is not separated into the first region and the second region, a position of the edge of interface of the liquids is uniquely determined with respect to an applied voltage. Thus, when a value of the applied voltage minutely changes due to disturbance or the like, the position of the edge of interface may be changed therewith.

As a liquid lens that prevents such a change of the position of the edge of interface due to disturbance or the like, the liquid lens 100 having the characteristic illustrated in FIG. 4A as in this embodiment is provided.

In the liquid lens 100, the exemplary configuration in which the affinity for the first liquid 102 of the first region 105 is higher than the affinity for the second liquid 103 is described above. Hereinafter, another exemplary configuration different from the above will be described. Specifically, an exemplary configuration will be described in which the affinity for the second liquid of the first region is higher than the affinity for the first liquid.

FIG. 3C is a schematic view illustrating an operation near an edge of interface of liquids when different voltages are applied to a liquid lens 400 in which an affinity for a second liquid of a first region is higher than an affinity for a first liquid, in contrast to the above mentioned liquid lens 100. In the liquid lens 400, an affinity for a second liquid 403 of a first region 405 is higher than an affinity for the second liquid 403 of a second region 406.

When an interface when a specific voltage V7, at which the edge of the interface is located in the first region 405, is applied to the liquid lens 400 is represented by an interface 421, if an applied voltage is increased to a specific voltage V8 described later, the interface 421 is moved to an interface 422 that is an interface when an edge of interface is located at an edge of the first region 405. When the applied voltage is further increased, the edge of interface is continuously located at the edge of the first region 405 within a certain range of voltages, and the interface is as represented by an interface 423.

When the interface is represented by the interface 423, a force to move the position of the interface 333 onto a position in the second region 406, where the sum of the interface energy and the static energy becomes minimum, and an affinity force to hold the first liquid 402 in the vicinity of the edge of the interface within the first region 405, are applied. When the affinity force is larger than the force to move the second liquid 403 onto the second region 406, the edge of interface is held to overlap the edge of the first region 405 like the interface 423. At this time, since the two forces in the different directions are applied to the second liquid 403 near the edge of interface, the edge of interface is stably held at the edge of the first region 405 even if disturbance to move the edge of interface occurs.

When the affinity for the first liquid 402 of the second region 406 is higher than the affinity for the first liquid 402 of the first region 405, the affinity force to hold the first liquid 402 on the second region 406 is applied to the first liquid 402. Then, the edge of interface is hard to move on the first region 405, and more stably held at the edge of the first region 405.

As is apparent from the interfaces 422 and 423 of the liquid lens 400 illustrated in FIG. 3C, the edge of the first region 405 at which the edge of interface is held refers to one of two edges of the first region 405, which the edge of interface reaches when an applied voltage is increased.

Figure 4C:
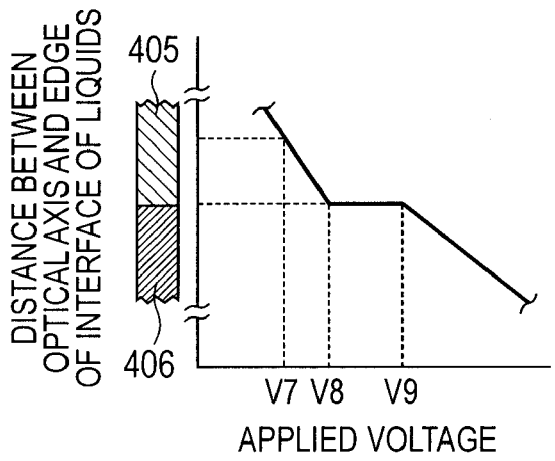
FIG. 4C is a view illustrating a relationship between a voltage and a distance between an optical axis and an edge of interface in the liquid lens in FIG. 3C in Embodiment 1.

FIG. 4C is a schematic diagram illustrating a relationship between an applied voltage and a distance between an optical axis and the edge of interface of the liquids in the liquid lens 400 illustrated in FIG. 3C. As illustrated in FIG. 4C, when the applied voltage is between a voltage V8 and a voltage V9, the edge of interface is held at the edge of the first region 405. In order to more stably hold the edge of interface, it is effective to set the applied voltage to a voltage away from V8 and V9 such as arithmetic mean or geometric mean of V8 and V9. If a difference between the affinity of the first region 405 and the affinity of the second region 406 is increased, a difference between the voltage V8 and the voltage V9 is increased. This is effective for more stably holding the edge of interface. Thus, it is also effective that the second region 406 does not have the affinity of the first region 405. For example, when the first region 405 has hydrophilic properties, the second region 406 may have water repellency.

To calculate values of the voltage V8 and the voltage V9, a position of the edge of interface may be observed while the applied voltage is gradually increased from the voltage V7, and a voltage at which the edge of interface is located at the edge of the first region 405 may be set to V8, and a voltage at which the edge of interface is moved away from the edge of the first region 405 may be set to V9.

In the following description, the liquid lens 100 illustrated in FIG. 1A will be described, but the description also applies to the liquid lens 400 illustrated in FIG. 3C.

As described above, since the liquid lens 100 illustrated in FIG. 1A is used with the edge of interface being held at the edge of the first region 105, a pitch of curvature of the interface depends on a pitch of a pattern of the first region 105 and the second region 106. Thus, the pitch of curvature of the interface may be determined from specifications of a control width of refractive power as one of optical performance required of the liquid lens 100, and the pattern of the first region 105 and the second region 106 may be formed with a pitch according to the pitch of curvature.

If the pattern of the first region 105 and the second region 106 is formed symmetrically with respect to the optical axis 111 of the liquid lens 100, the edges of the first region 105 are also symmetrical with respect to the axis, and thus the edges of interface of the liquids are held symmetrically with respect to the axis. Specifically, a central axis of the interface can be aligned with the optical axis 111 of the liquid lens 100.

As another method of aligning the central axis of the interface with the optical axis of the liquid lens, it is also effective that a portion of the edge of interface of the first liquid and the second liquid in contact with an insulating layer may be an inner wall portion of a cylinder or an inner tapered portion in Embodiment 2 described later.

The liquid lens of the present invention also includes a liquid lens in which in a container that contains a liquid and has a surface on which a light from outside is incident formed of a member having optical transparency, an insulating first liquid and a conductive second liquid having optical transparency and having different non-miscibilities and refractive indexes are contained so that an upper portion of a spherical shape formed by the first liquid at an interface of the liquids is covered by the second liquid, and optical characteristics are changed by a change of interface shape of the first liquid and the second liquid caused by application of a voltage to an electrode provided in the container: in which an insulating layer is formed on a surface in contact with an edge of interface of the first liquid and the second liquid via a thin film; the electrode is formed in a position on a side opposite to the first liquid and the second liquid via the insulating layer; the thin film includes a first region having an affinity for the first liquid and a second region having an affinity different from the affinity for the first liquid; and when the voltage is applied to the electrode in order to change the interface shape of the first liquid and the second liquid, two forces in different directions by an affinity force to hold the first liquid in the vicinity of the edge of the interface within the first region and a force to move the edge of the interface by electro-wetting are applied, and the edge of interface of the first liquid can be held at an edge of the first region having the affinity.

Embodiment 2

As Embodiment 2, an exemplary configuration of a liquid lens having a configuration different from that of Embodiment 1 will be described with reference to FIGS. 5A and 5B.

Figure 5A:
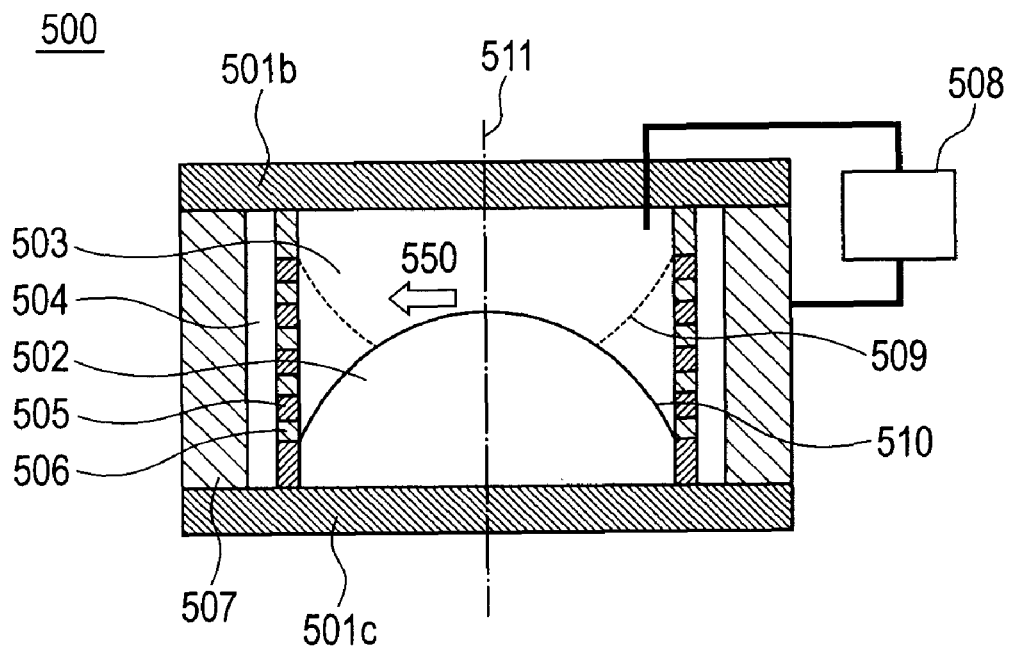
FIG. 5A is a sectional view of a liquid lens according to Embodiment 2 of the present invention.
Figure 5B:
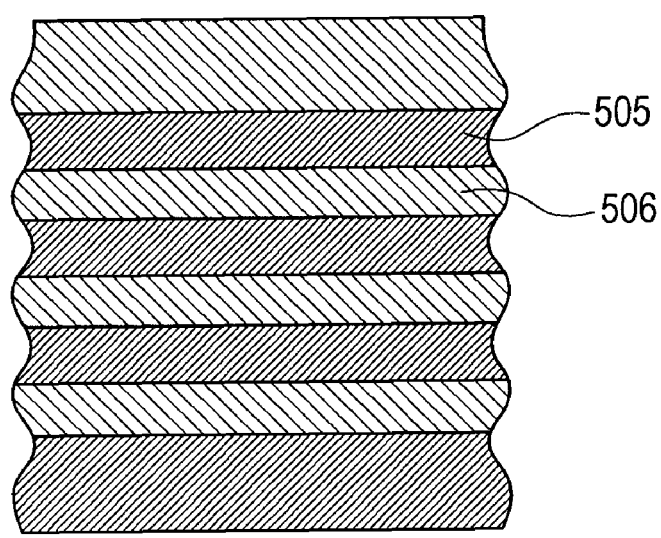
FIG. 5B is a view of the liquid lens of FIG. 5A taken in the direction of arrow therein, according to Embodiment 2 of the present invention.

In FIGS. 5A and 5B, a liquid lens 500 includes lid members 501*b* and 501*c*, a first liquid 502, a second liquid 503, an insulating layer 504, a first region 505, a second region 506, and an electrode 507.

As illustrated in FIG. 5A, the liquid lens 500 of this embodiment includes a cylindrical container in which the lid members 501*b* and 501*c* having optical transparency are joined to opposite ends of the cylindrical electrode 507. The cylindrical container contains the first liquid 502 having insulating properties and optical transparency, and the second liquid 503 having conductivity and optical transparency.

The first liquid 502 and the second liquid 503 have non-miscibilities and different refractive indexes to each other. When the first liquid 502 and the second liquid 503 have different densities, the interface of the liquids is not formed into a spherical shape by the effect of gravity. Thus, the first liquid 502 and the second liquid 503 desirably have close densities.

The cylindrical electrode 507 is formed on an inner wall side of a side wall formed in the same direction as a light incident direction in the cylindrical container on the side opposite to the first liquid 502 and the second liquid 503 via the insulating layer 504. The first liquid 502 and the second liquid 503 are in contact with the insulating layer 504 formed parallel to an optical axis 511 passing through a center of a cross-section of the cylindrical container on the inner wall of the cylindrical electrode 507 via a thin film. The thin film is formed of the first region 505 and the second region 506 having different affinities for the first liquid 502 on the insulating layer 504. An affinity for the first liquid 502 of the first region 505 is higher than an affinity for the first liquid 502 of the second region 506. An affinity for the first liquid 502 of the first region 505 is higher than an affinity for the second liquid 503.

FIG. 5B is a view of the first region 505 and the second region 506 in the liquid lens 500 in FIG. 5A taken in the direction of arrow 550. As illustrated in FIGS. 5A and 5B, the first region 505 and the second region 506 are formed in a circular pattern surrounding an optical axis 511.

A voltage application apparatus 508 applies a voltage between the second liquid 503 and the electrode 507, and thus the interface of the first liquid 502 and the second liquid 503 can be changed from an interface 509 to an interface 510.

The liquid lens 500 illustrated in FIG. 5A has a structure in which a light is incident from outside in a direction of an optical axis 511. The lid members 501*b* and 501*c* need to have optical transparency and are thus formed of members having optical transparency such as glass or acrylic. Unlike Embodiment 1, the insulating layer 504 and the electrode 507 in the liquid lens 500 illustrated in FIG. 5A do not exist on an optical path and do not need to have optical transparency.

Since the optical transparency required of the liquid lens of this embodiment differs depending on uses of the liquid lens, a broad transparent wavelength width or high optical transmittance are not always necessary. Thus, the optical transparency is not specified by a qualitative or quantitative specific reference.

Silicone oil or the like is used as the first liquid 502, and a sodium chloride solution or the like is used as the second liquid 503. An example of forming the first region 505 and the second region 506 when silicone oil is used as the first liquid 502 and a sodium chloride solution is used as the second liquid 503 is as described in Embodiment 1.

In order to stably hold the interface of the liquids in the liquid lens 500 illustrated in FIG. 5A, as described in Embodiment 1, a voltage is applied in a range where the edge of interface is held at the edge of the first region 505.

A relationship between affinities for the first liquid 502 and the second liquid 503 of the first region 505 and the second region 506 in the liquid lens 500 illustrated in FIG. 5A is the same as the relationship in the liquid lens 100 illustrated in FIG. 3A. Thus, the edge of the first region 505 at which the edge of interface is held refers to one of two edges of the first region 505, which the edge of interface reaches when an applied voltage is reduced.

The affinities of the first region 505 and the second region 506 in the liquid lens 500 illustrated in FIG. 5A may be the same as the affinities of the first region 405 and the second region 406 in the liquid lens 400 illustrated in FIG. 3C. Also in this case, in order to stably hold the interface of the liquids, a voltage is applied in a range where the edge of interface is held at the edge of the first region as described in Embodiment 1.

The edge of interface in this case refers to one of two edges of the first region, which the edge of interface reaches when an applied voltage is increased as in the case of using the liquid lens 400.

As the liquid lens 500 illustrated in FIG. 5A, with the structure in which the insulating layer 504 in contact with the edge of interface of the liquids is symmetrical with respect to the optical axis 511, and the edge of interface is moved along with the direction of optical axis 511, a central axis of the interface can be aligned with the optical axis 511. In the liquid lens 500 of this embodiment, the central axis of the interface of the liquids is aligned with the optical axis of the liquid lens by the structure of the liquid lens 500, and the edge of interface is stably held by the pattern of the first region 505 and the second region 506.

In the liquid lens 500 illustrated in FIG. 5A, the edge of interface of the liquids is moved along with the direction of the optical axis 511. Thus, a curvature of the interface can be changed within the range of both of negative value and positive value, and further, an optical effective area can be always constant irrespective of the curvature.

As described in Embodiment 1, a pitch of the pattern of the first region 505 and the second region 506 in the liquid lens 500 illustrated in FIG. 5A may be determined in accordance to a control width of refractive power as one of optical performance required of the liquid lens 500.

As described below, the cylindrical electrode 507 of the liquid lens 500 may be changed to a cylindrical electrode having a tapered shape on an inner side.

Figure 6A:
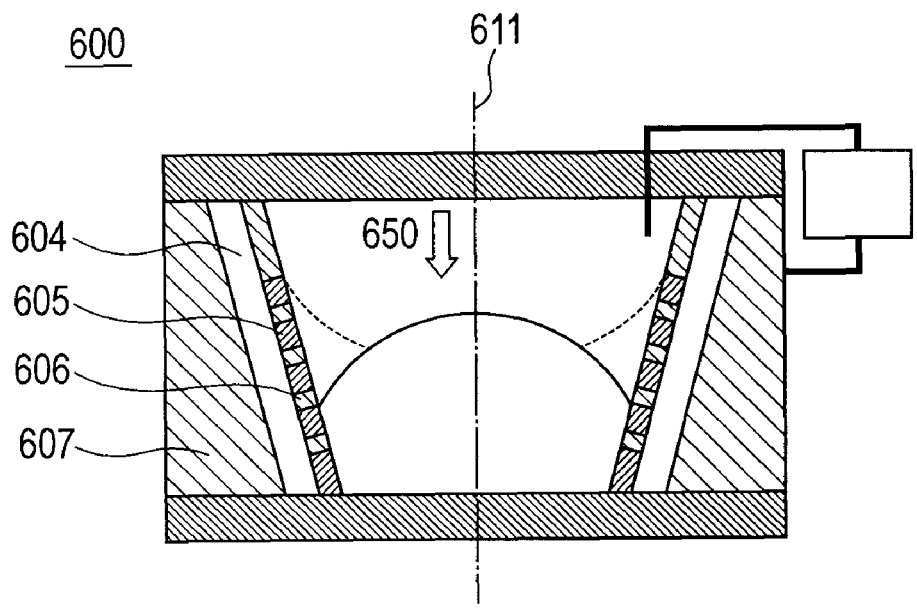
FIG. 6A is a sectional view of a liquid lens having a configuration different from that of the liquid lens in FIG. 5A.
Figure 6B:
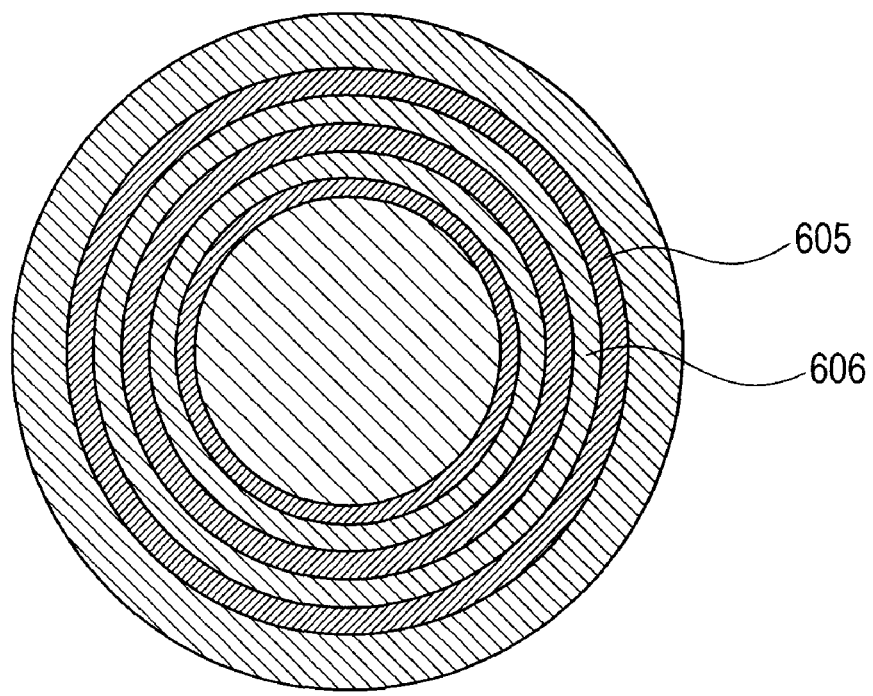
FIG. 6B is a view of the liquid lens of FIG. 6A taken in the direction of arrow therein.

FIG. 6A is a sectional view of a liquid lens 600 using a cylindrical electrode 607 having a tapered shape on an inner side instead of the cylindrical electrode 507 in the liquid lens 500 illustrated in FIG. 5A. FIG. 6B is a view taken in the direction of arrow 650 of a first region 605 and a second region 606 that constitute an insulating layer 604 in the liquid lens 600 in FIG. 6A.

As illustrated in FIG. 6B, the first region 605 and the second region 606 are formed in a concentric pattern around an optical axis 611 of the liquid lens 600, which passes through a center of a cross section of the cylindrical container.

Like the liquid lens 500 illustrated in FIG. 5A, in the liquid lens 600 illustrated in FIG. 6A, a central axis of the interface of the liquids can be aligned with the optical axis 611. In the liquid lens 600 illustrated in FIG. 6A, the curvature of the interface can be changed within the range of both of negative value and positive value, and further, a curvature of the interface without the voltage being applied can be determined by a taper angle of the electrode 607.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-294919, filed Dec. 25, 2009, which is hereby incorporated by reference herein in its entirety.

What is claimed is:

1. A liquid lens in which, in a container that contains a liquid, an insulating first liquid and a conductive second liquid having non-miscibility and different refractive indexes to each other are contained, wherein optical characteristics are changed by a change of an interface shape of the first liquid and the second liquid caused by application of a voltage to an electrode provided in the container, the liquid lens comprising:

in a surface in contact with an edge of an interface of the first liquid and the second liquid, a first region having an affinity for the first liquid;

a second region having an affinity different from the affinity for the first liquids; and a voltage applying unit, wherein a plurality of the first regions and a plurality of the second regions are formed in a concentric pattern with the center of the pattern as a position of an optical axis of the lens, and wherein the voltage applying unit applies the voltage such that the edge of the interface of the first liquid and the second liquid is located at one of borders of the first regions and the second regions.

2. The liquid lens according to claim 1, wherein the surface in contact with the edge is formed of a thin film formed on an insulating layer.

3. The liquid lens according to claim 2, wherein the insulating layer is formed perpendicularly to an optical axis direction of a light incident from outside.

4. The liquid lens according to claim 2, wherein the insulating layer is formed on an inner wall side of the container in parallel with the optical axis direction of a light incident from outside.

5. The liquid lens according to claim 1, wherein an affinity for the first liquid of the first region is higher than an affinity for the first liquid of the second region, and the affinity for the first liquid of the first region is higher than an affinity for the second liquid.

6. The liquid lens according to claim 1, wherein an affinity for the second liquid of the second region is higher than an affinity for the second liquid of the first region, and the affinity for the second liquid of the second region is higher than the affinity for the first liquid.

7. The liquid lens according to claim 2, wherein the container is formed of a cylindrical container, and the first region and the second region are formed in a circular pattern around an optical axis of the liquid lens which passes through a center of a cross section of the cylindrical container.

* * * * *